US008807807B2

(12) United States Patent
Wheeler et al.

(10) Patent No.: US 8,807,807 B2
(45) Date of Patent: Aug. 19, 2014

(54) ILLUMINATION APPARATUS FOR VEHICLES

(71) Applicant: Tesla Motors, Inc., Palo Alto, CA (US)

(72) Inventors: David Wheeler, San Carlos, CA (US); Brenda Cucci, San Carlos, CA (US); Adam S. Kilgore, San Francisco, CA (US); Daryl Zalan, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 199 days.

(21) Appl. No.: 13/628,034

(22) Filed: Sep. 26, 2012

(65) Prior Publication Data

US 2014/0022811 A1    Jan. 23, 2014

Related U.S. Application Data

(60) Provisional application No. 61/539,337, filed on Sep. 26, 2011, provisional application No. 61/539,203, filed on Sep. 26, 2011, provisional application No. 61/539,499, filed on Sep. 27, 2011, provisional application No. 61/539,580, filed on Sep. 27, 2011.

(51) Int. Cl.
*B60Q 1/00* (2006.01)
*B60Q 1/26* (2006.01)
*B60Q 3/00* (2006.01)
*E05B 65/12* (2006.01)

(52) U.S. Cl.
CPC  *B60Q 3/002* (2013.01); *G01B 6/00* (2013.01); *E05B 85/00* (2013.01); *B60Q 1/2669* (2013.01); *B60Q 2400/40* (2013.01)
USPC .......................................... 362/501; 362/511

(58) Field of Classification Search
USPC .......................... 362/501, 511, 551, 554–556
See application file for complete search history.

(56) References Cited

U.S. PATENT DOCUMENTS 7,751,664 B2 *  7/2010  Ieda et al. ........................ 385/49

* cited by examiner

*Primary Examiner* — Jason Moon Han
(74) *Attorney, Agent, or Firm* — J. Richard Soderberg (57) ABSTRACT

Aspects of the disclosure provide a door handle assembly used in a vehicle door having an illumination module and illumination source that directs light in a first direction and a second direction using a pair of light pipes. The door handle from the door handle assembly includes a first illumination aperture oriented in the first direction and a second illumination aperture oriented in the second direction. As the illumination source generates light, the first light pipe receives a first portion of light and directs it toward a first illumination surface and the first illumination aperture in the first direction. By molding the second light pipe around the first light pipe, remaining light is captured from the illumination source as a second portion of light. The second portion of light reflects along the interior surfaces of the second light pipe towards the second illumination surface oriented in the second direction.

16 Claims, 12 Drawing Sheets

ILLUMINATION APPARATUS FOR VEHICLES

(1) CROSS-REFERENCE TO RELATED APPLICATIONS

This application claims the benefit of: (1) U.S. Provisional Application No. 61/539,203, filed Sep. 26, 2011, entitled, "DOOR RELEASE LATCH UTILIZING A CAPACITIVE SENSOR" by Wheeler et. al, (2) U.S. Provisional Application No. 61/539,337, filed Sep. 26, 2011, entitled, "SINGLE SOURCE DUAL PURPOSE, VEHICLE DOOR HANDLE ILLUMINATOR" by Wheeler et. al, (3) U.S. Provisional Application No. 61/539,499, filed Sep. 27, 2011, entitled, "ELECTRO-MECHANICAL SWITCH ASSEMBLY FOR EXTERIOR VEHICLE DOOR HANDLE" by Wheeler et. al, (4) U.S. Provisional Application No. 61/539,580, filed Sep. 27, 2011, entitled, "SELF-DEPLOYING OUTSIDE DOOR HANDLE" by Wheeler et. al, assigned to the assignee of this application and incorporated by reference herein for all purposes. Each of the above-referenced patent applications is incorporated by reference herein for all purposes.

(2) TECHNICAL FIELD

The subject matter described herein relates to safety and convenience features used on a vehicle and more particularly to exterior illumination for use in a vehicle door handle.

(3) DESCRIPTION OF THE RELATED ART

Most modern vehicles require some type of exterior door handle to open and close the vehicle doors. The exterior door handle is mounted over a recessed area in the door creating a finger opening or place to insert one's hand while unlocking and opening the door. The conventional exterior door handle spans this recessed area in the door and incorporates a mechanical hinge, a paddle, or other mechanical actuator to engage the latch and open the door. As the exterior door handle pivots on the mechanical actuator, the door latch mechanism for the vehicle door is actuated causing the door to unlatch and open.

In low-light or dark environments, it is useful to have lighting on the vehicle to locate and use the door handle and open the door. On many cars, a light is placed near the door handle to illuminate the location of the handle and keyhole for unlocking and opening the door. Once the light near the door handle is lit, a person can more easily locate the car (e.g., in a large parking lot or structure) and then quickly open the door. If a key is required to open the door, the light also assists inserting a key into a keylock without scratching the paint or other areas around the keyhole on the door.

Some vehicles may also include an additional or second light located on a rear-view mirror that points downward towards the ground near the front portion of the vehicle. In addition to helping locate the vehicle, these rear-view mirror lights expose puddles, mud, or other hazards on the ground area under the rear-view mirror. Unfortunately, hazards near the door are not likely to be seen given the shorter range of the lights mounted on the rear-view mirrors. Indeed, if the vehicle is a sedan with multiple doors, hazards near these other doors on the vehicle will also not be visible as the lighting provided may be too dim or blocked by other individuals entering the car.

In an attempt to address these and other safety and convenience concerns, some car manufacturers add additional discrete lights to the car and either increase the overall car's cost or sacrifice profits. If the lights are not properly located or engineered, even additional lights may still not squarely address these problems. On the other hand, if manufacturers are not aware of these deficiencies or cannot justify the added costs, a large number of car manufacturers may overlook or not address these and other lighting issues at all.

SUMMARY

Aspects of the disclosure provide a door handle assembly having an illumination module that directs light from a shared illumination source in a first direction and a second direction using a pair of light pipes. The door handle from the door handle assembly includes a first illumination aperture oriented in the first direction and a second illumination aperture oriented in the second direction. The first illumination aperture is oriented towards a handle grip pocket area of the door handle and the second illumination aperture is oriented towards the ground area under the door handle. By sharing the illumination source with the two light pipes, the illumination module is reduced in size and fits inside a compact area of the door handle. As the illumination source generates light, the first light pipe receives a first portion of light and, using reflective interior surfaces of the light pipe, directs it toward a first illumination surface and the first illumination aperture; light rays emanating from the first illumination surface may be used to illuminate the handle grip pocket. By molding the second light pipe around the first light pipe, the remaining light from the illumination source is captured as a second portion of light. The second portion of light reflects along the interior surfaces of the second light pipe in the second direction towards the second illumination surface. Light rays from the second light pipe pass from the second illumination surface through the second illumination aperture; these light rays illuminate the ground area under the door handle assembly.

DETAILED DESCRIPTION

In the following detailed description, for purposes of explanation, numerous specific details are set forth to provide a thorough understanding of the various embodiments of the disclosure. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Figure 1A:
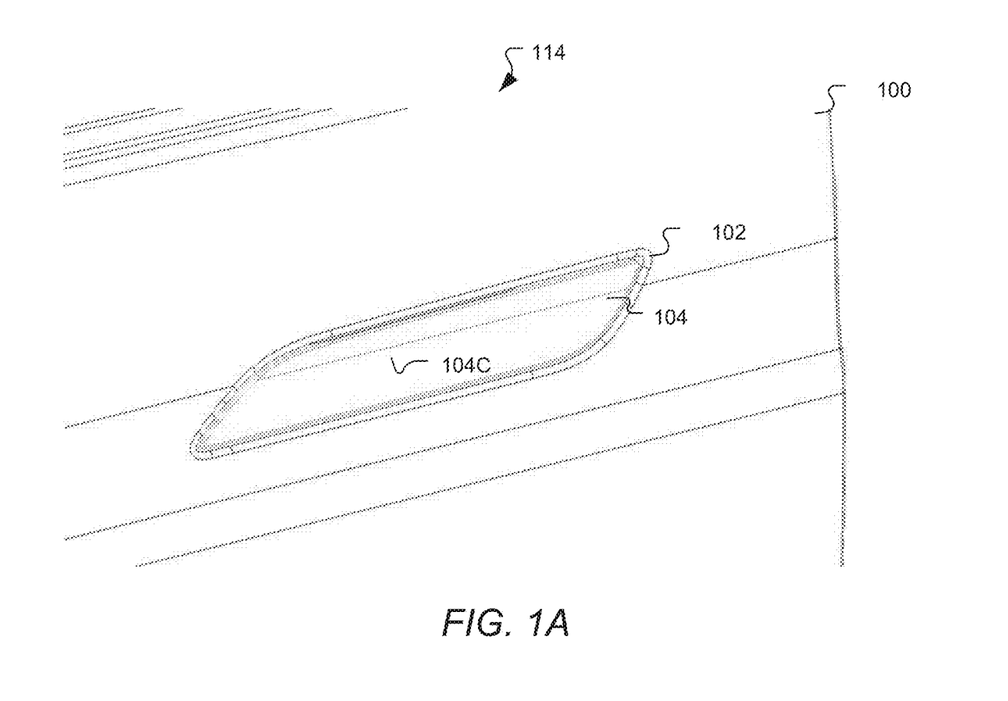
FIG. 1A-1B provides an exterior view of a vehicle door portion with a door handle in both a retracted position (FIG. 1A) and extended position (FIG. 1B) in accordance with some embodiments.
Figure 1B:
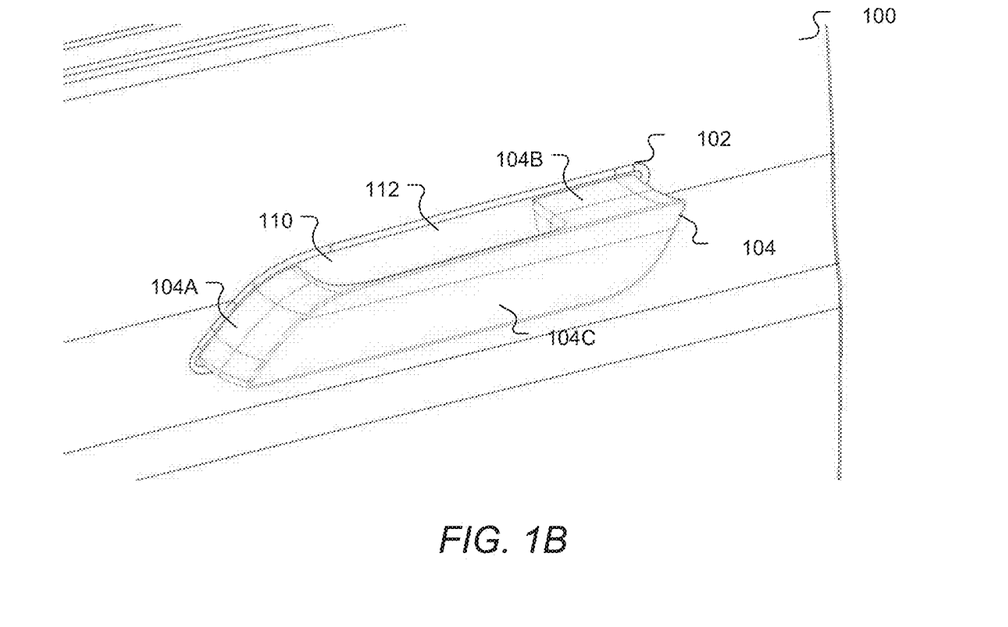

Referring to FIG. 1A-1B, a door handle in both a retracted and extended position in accordance with some embodiments is provided along with an exterior view of a vehicle door portion. The vehicle door portion 114, as illustrated, has an outer door surface 100 and a handle aperture 102 that door handle 104 passes through. In some embodiments, the handle aperture 102 in the vehicle door may be formed using a sleeve fitted through the vehicle door. Alternate embodiments may instead incorporate handle aperture 102 directly into the material used to manufacture the vehicle door.

In the retracted position depicted in FIG. 1A, a planar handle member 104C of the door handle 104 is flush with the outer door surface 100 and has an outside shape that fits handle aperture 102. Keeping door handle 104 in the retracted position provides both a smooth appearance and advantageous aerodynamic qualities when the vehicle is in motion. When the vehicle is stopped or operating at a relatively slow speed, door handle 104 may be extended, or deployed, with planar handle member 104C moving in a parallel manner from outer door surface 100 to a predetermined height, typically corresponding to the height of first post portion 104B or second post portion 104A of planar handle member 104C.

To further enhance the overall comfort, safety, and appearance, some embodiments of door handle 104 are formed by coupling a handle base member 110 to planar handle member 104C at the distal portions of first post portion 104B and second post portion 104A. In the deployed state, planar surface of handle base member 110 extending between first post portion 104B and second post portion 104A may also be substantially flush with surrounding areas of outer door surface 100. The resulting smooth contiguous surface presented as a hand is inserted in the wrapped handle grip 112 engenders quality and integrity, both visually and practically, in the operation of door handle 104 and the vehicle to which it is attached.

To give the door handle 104 the appearance of gradually floating into position, several different subcomponents or assemblies are used under the direction of a combination of one or more controllers as depicted in FIGS. 2, 3A-B, 4, 5A, 5B, 7-8. The subcomponents in some embodiments include a door assembly 200, a handle assembly tray 304, and an inner door assembly aperture 302A portion of the inner door surface 302. For example, door assembly 200 may be installed inside handle assembly tray 304 before the handle assemble tray 304 is then mounted in an opening in the inner door, the inner door assembly aperture 302A. The modular design of handle assembly tray 304 facilitates cost-effective manufacture and allows selective use of stiffening materials in handle assembly tray 304, rather than the entire inner door surface 302, to enhance the overall precision and alignment of door assembly 200 when it is installed and operable. Once mounted, the handle assembly tray 304 holding the door assembly 200 becomes integral to the inner door surface 302 and the vehicle door as a whole. Accordingly, in alternate embodiments portions of inner door surface 302 may be designed to directly receive door assembly 200, this would obviate using handle assembly tray 304 to install door assembly 200 as a modular separate from the vehicle door.

Figure 2:
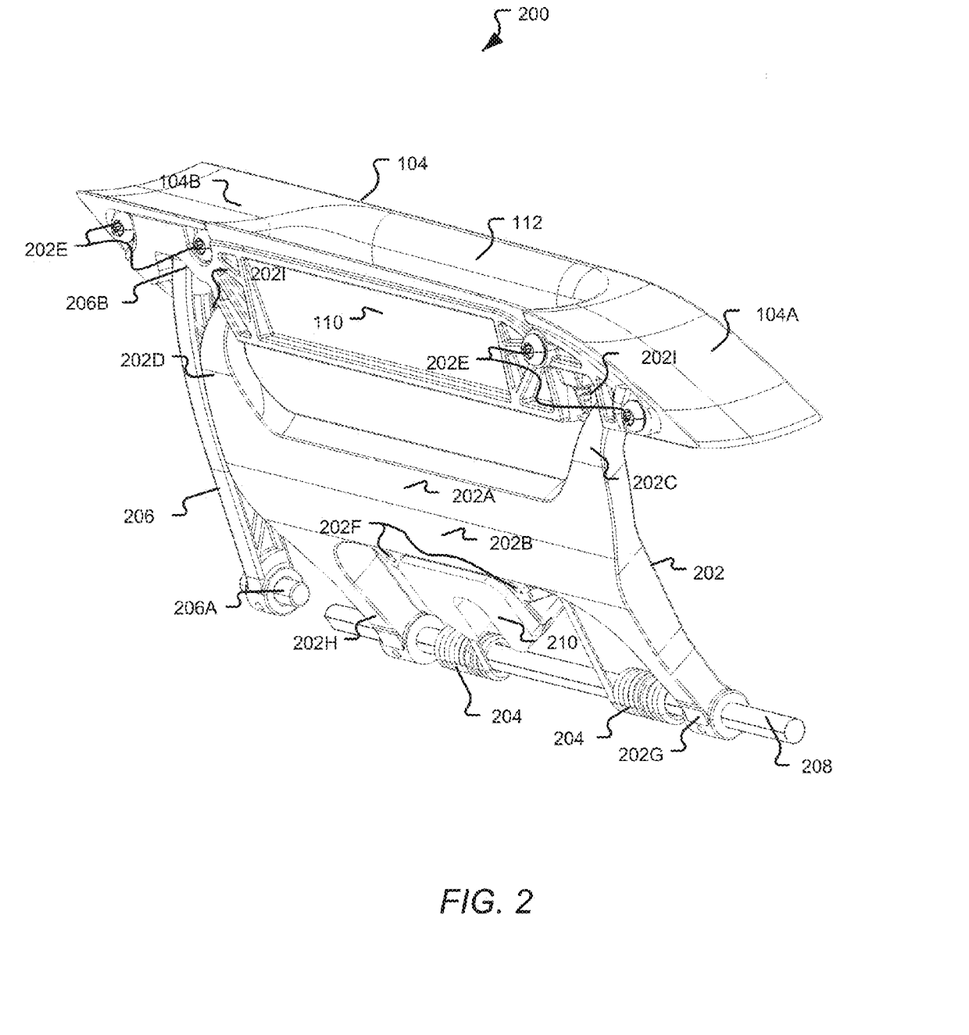
FIG. 2 provides a perspective view of a door handle assembly from an interior perspective in accordance with some embodiments.

By securely attaching handle base member 110 to door handle 104 with handle fasteners 202E, both the door handle 104 and handle base member 110 move together when urged by a swing arm 202. Swing arm 202 in one embodiment has both an upper dual fork portion 202A and a lower dual fork portion 202B, and may be referred to as a "swan neck fork" arm due to the widely spaced arcuate forks. In this embodiment, the shape of each arcuate fork and the width between forks provide a stiffness that reduces torsional displacement and linear deflection when the door handle 104 is used. As the term "arcuate" refers to all or portions of a circular line, it is contemplated that the arcuate shapes of dual forks in upper dual fork portion 202A and lower dual fork portion 202B, as well as the width between each fork, may be modified depending on the implementation details.

From upper dual fork portion 202A, a first upper fork 202C is rotably coupled to a backside of handle base member 110 near the distal portion of the second post portion 104A. Likewise, a second upper fork 202D from the upper dual fork portion 202A is also rotably coupled to the backside of the handle base member 110 near the distal portion of the first post portion 104B. In some implementations, both second upper fork 202D and first upper fork 202C fit into slotted openings 202I within handle base member 110. A smaller shaft passes through axial openings in the walls of each slotted opening 202I and the ends of each upper dual fork portion 202A, this enables the door handle 104 and handle base member 110 to pivot about the upper portion of swing arm 202.

Figure 3A:
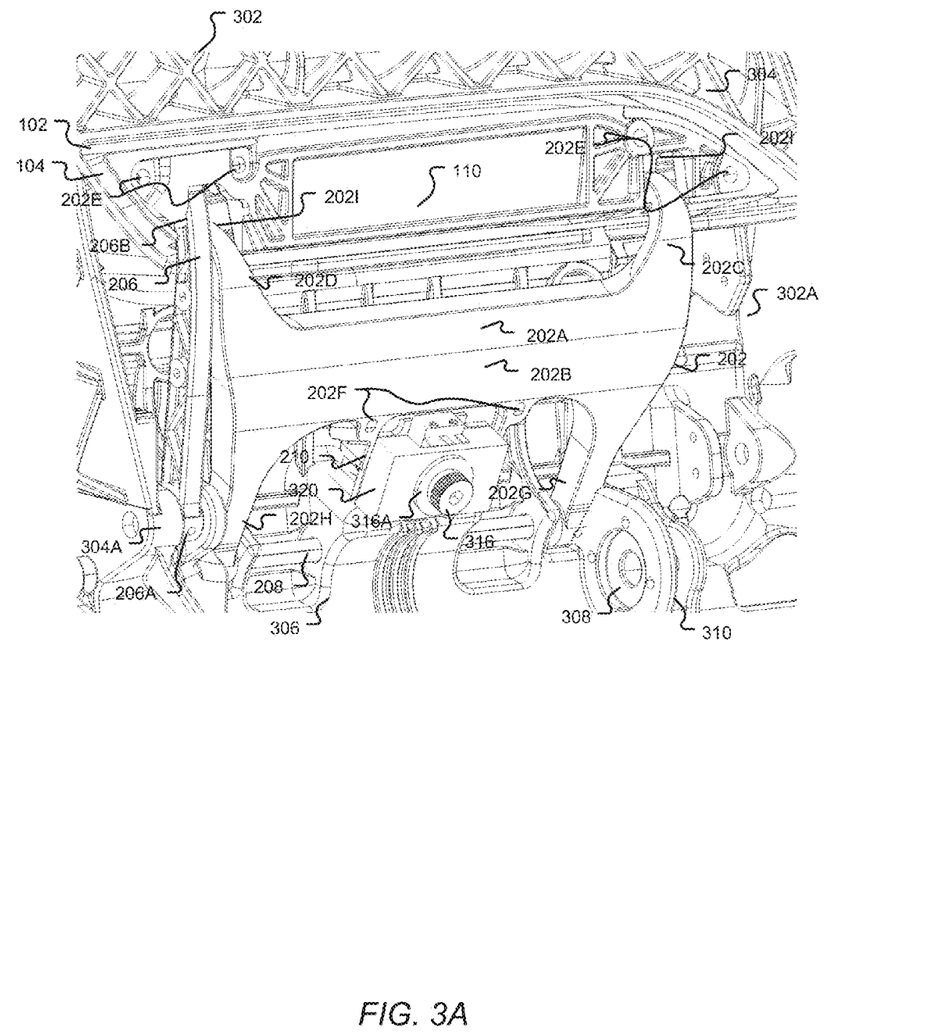
FIG. 3A-3B provides another perspective view of a door handle assembly installed in a door handle tray (FIG. 3B) and attached to an inner door surface of a door (FIG. 3A) in accordance with some embodiments.
Figure 3B:
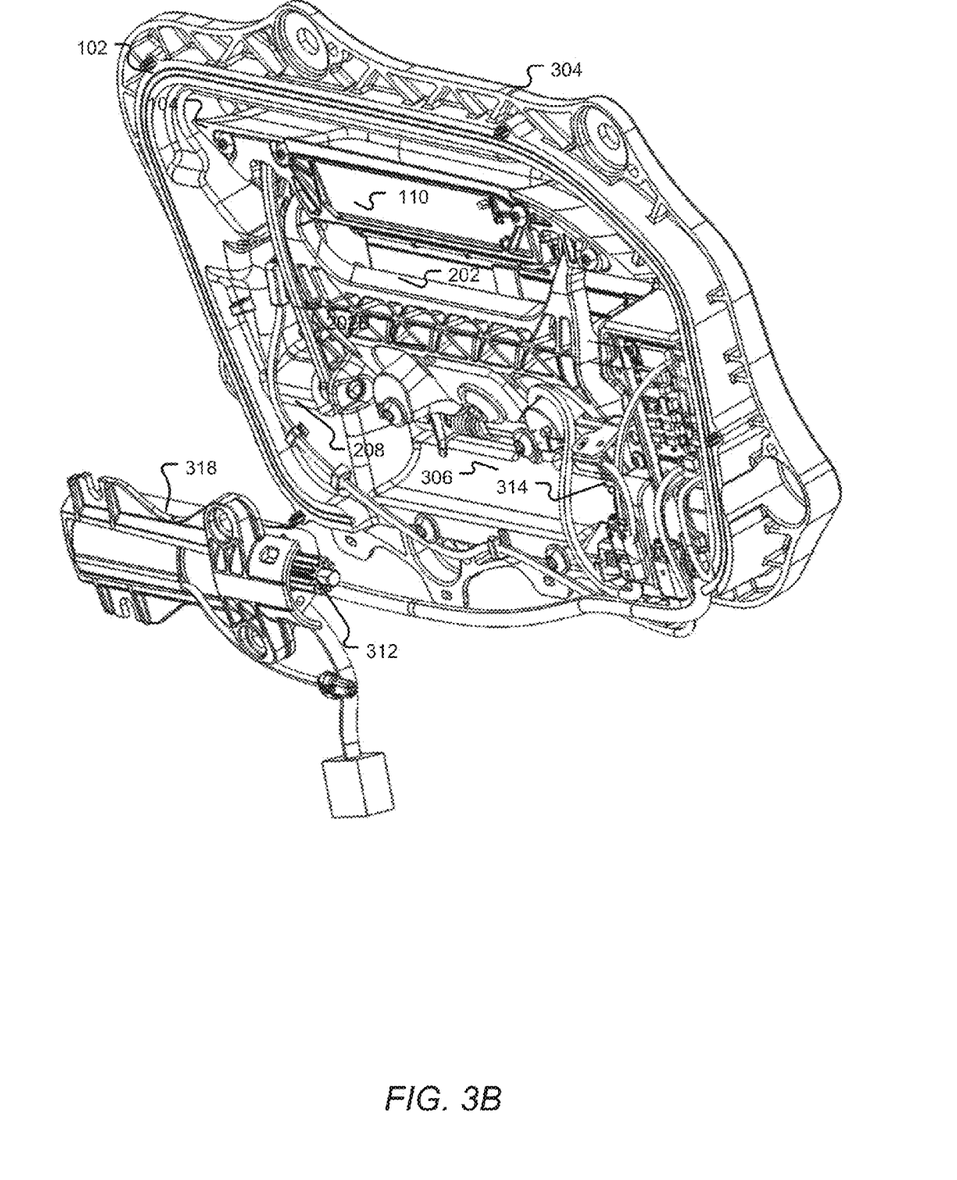

In some embodiments, lower dual fork portion 202B pivots about a shaft 208 slidably inserted through corresponding axial openings in handle assembly tray 304. If an assembly tray 304 is not utilized to mount door handle assembly 200, shaft 208 may alternatively be axially attached through openings made directly in the inner door surface 302. In either embodiment, once the lower dual fork portion 202B is also rotably attached to shaft 208, pivoting of the swing arm 202 also results in movement of the door handle 104 and handle base member 110. In particular, as the swing arm 202 pivots around shaft 208, the upper dual fork portion 202A of the swing arm 202 moves portions of door handle 104 between outer door surface 100 and inner door surface 302. For example, moving the swing arm 202 towards the inner door surface 302 causes door handle 104 to extend through handle aperture 102, this positions the door handle 104 above the outer door surface 100. Conversely, moving the swing arm 202 away from the inner door surface 302 urges the door handle 104 to retract through the handle aperture 102, this eventually results in retracting the planar handle member 104C until it is flush with the outer door surface 100.

As the door handle 104 extends and retracts through handle aperture 102, control arm 206 keeps its motion along a parallel direction. The precision and predictability of this parallel motion compliments the overall design and further engenders an impression of reliability, integrity, and craftsmanship of the vehicle handle 104 and the vehicle in which it is used. The parallel motion of the door handle 104 also helps accommodate a tight packaging requirement within the door while providing a wrapped handle grip 112 with adequate clearance for fingers and a hand. Within the interior of the car door, for example, the swing arm 202 can retract door handle 104 without damaging a retracted window of the car door. In some embodiments, an upper control arm pivot 206B rotably connected to the backside of the handle base member 110 is positioned off-axis to the rotably coupled second upper fork 202D. Similarly, a corresponding lower control arm pivot 206A is rotably connected to the inner door surface 302 of the vehicle door and positioned off-axis to the rotably coupled second lower fork 202H. Combined together, the off-axis positioning of control arm 206 relative to swing arm 202 creates a four-bar link for motion control, this controls the longitudinal rotation of the vehicle handle 104 and constrains the vehicle handle 104 movement along a parallel direction.

A biasing member 204, implemented in some embodiments with springs, operates to urge door handle 104 into a retracted position flush with the outer door surface 100. Coiled portions of the springs from biasing member 204 are wrapped around shaft 208 while tails of the springs are inserted into spring insertion points 202F. While the force imparted by biasing member 204 urges the swing arm 202 to retract, it is not strong enough to pinch or hurt a hand inserted into wrapped handle grip 112 of door handle 104. Consequently, if a hand is inside wrapped handle grip 112, biasing member 204 may partially retract the door handle 104 towards the inner door surface 302 stopping when the person's hand meets the handle aperture 102.

To extend the vehicle handle 104, one embodiment of door handle assembly 200 utilizes a handle motor 318 and various drive components. A motor mount 306 in the door handle assembly 200 receives the handle motor 318 with a drive shaft passing through motor shaft opening 308. Drive gear 312 is axially mounted on the drive shaft and, when positioned in drive gear slot 310, engages with and meshes to gears from a paddle gear 314. By mounting paddle gear 314 eccentrically about shaft 208 and rotating handle motor 318 in a first direction, the gears are advanced and the opposing face of the paddle, at the distal end, slidably engages first lower fork 202G. The force imparted upon first lower fork 202G overcomes the opposing force from biasing member 204 thus urging swing arm 202 towards the inner door surface 302 and moving door handle 104 into an extended position.

Figure 4:
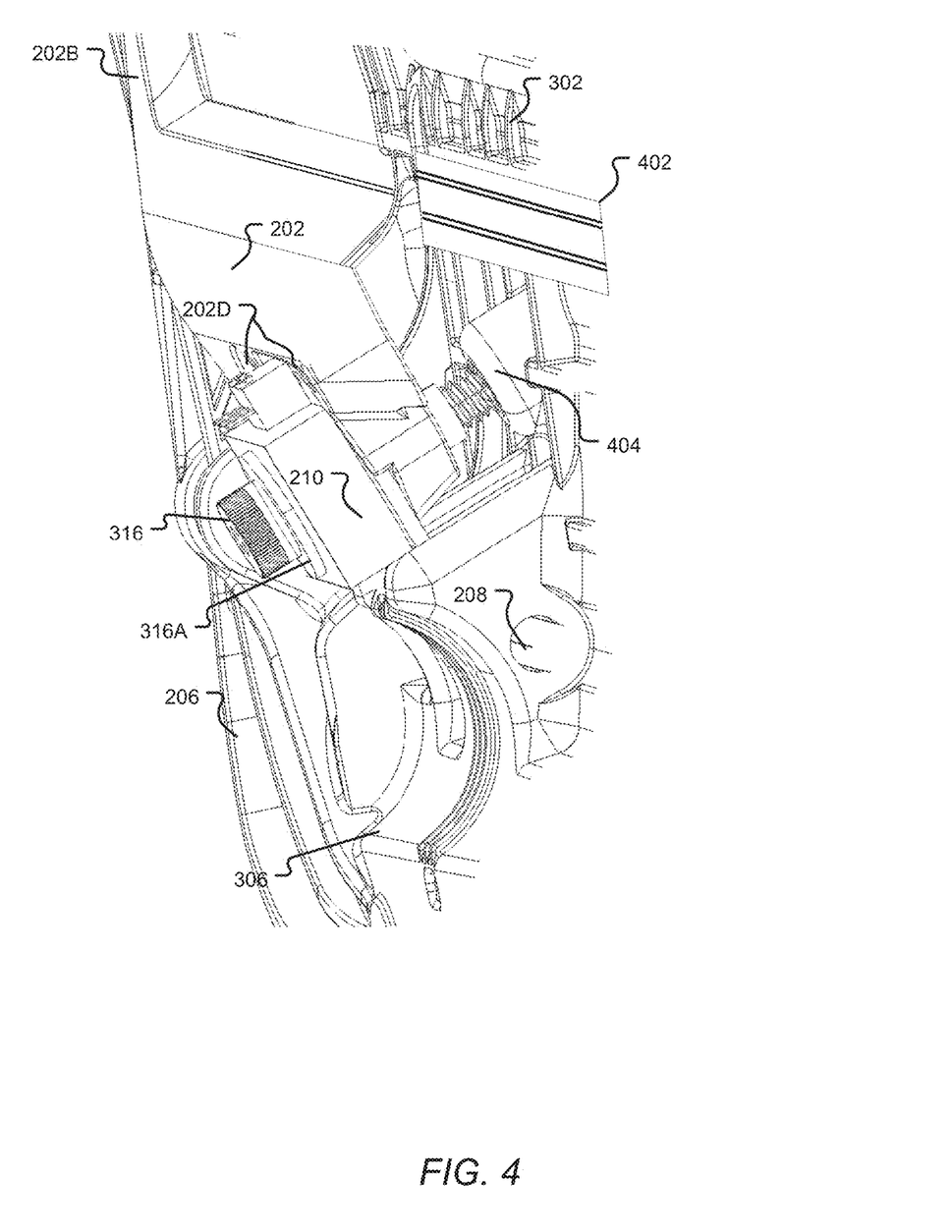
FIG. 4 provides a cross-sectional side view of a door handle assembly exposing a min extension request sensor and a max extension sensor in accordance with some embodiments.

In some embodiments, the handle motor 318 stops rotating in the first direction when the upper dual fork portion 202A applies pressure to max extension sensor 402, this condition indicates the door handle 104 is fully extended. To keep the vehicle handle in this extended position, a handle controller 616 monitoring max extension sensor 402 instructs the handle motor 318 to stop rotating in the first direction. Planetary gears incorporated in handle motor 318 resist retracting vehicle handle 104, even under the force imparted from biasing member 204.

The handle controller 616 may subsequently instruct handle motor 318 to rotate in the second direction, opposite the first rotational direction, thereby overcoming the torque of the planetary gears and allowing biasing member 204 to retract vehicle handle 104. This reduces the chance of pinching fingers or hands in wrapped handle grip 112 as the flat side of paddle gear 314 drops away from first lower fork 202G and only the force of biasing member 204 retracts vehicle handle 104. The handle controller 616 instructions the handle motor 318 to stop rotating in the second direction when the lower dual fork portion 202B applies pressure on min extension sensor 320, this condition indicates the door handle 104 is fully retracted.

In various embodiments, max extension sensor 402 and min extension sensor 320 may be implemented using a variety of mechanical, electromechanical, solid-state, nano-particle, piezo-electric based technologies capable of detecting a force, a change in force, a distance traveled, a change in electrical resistance, deformation or other events producing results that may be detected and processed by handle controller 616. In one embodiment, signals from both max extension sensor 402 and min extension sensor 320 corresponding to a force applied when a hand is operating the door handle 104 or when the door handle 104 is in either an extended or retracted position.

Min extension sensor 320 is fixedly mounted on a sensor flange 210 located between the first lower fork 202G and second lower fork 202H of lower dual fork portion 202B. In some embodiments, placing sensor flange 210 and min extension sensor 320 equidistant from the first lower fork 202G and second lower fork 202H helps maintain even pressure on min extension sensor 320. A flush adjuster rod 316 placed through a longitudinal slot or aperture in min extension sensor 320 limits how far swing arm 202 may retract. The flush adjuster rod 316 passes through both min extension sensor 320 and sensor flange 210 into a threaded opening 404 of the inner door surface 302. The size of annular flange 316A is sufficiently large to evenly distribute force from swing arm 202 over the face of min extension sensor 320. Some embodiments may integrate the annular flange 316A into the top of flush adjuster rod 316 or by axially sliding a washer or gasket into place over the flush adjuster rod 316. To fit door assembly 200 into a vehicle door during manufacture, the flush adjuster rod 316 is axially adjusted against the force of biasing member 204 until the surface of planar handle member 104C is flush with the outer door surface 100.

Figure 6:
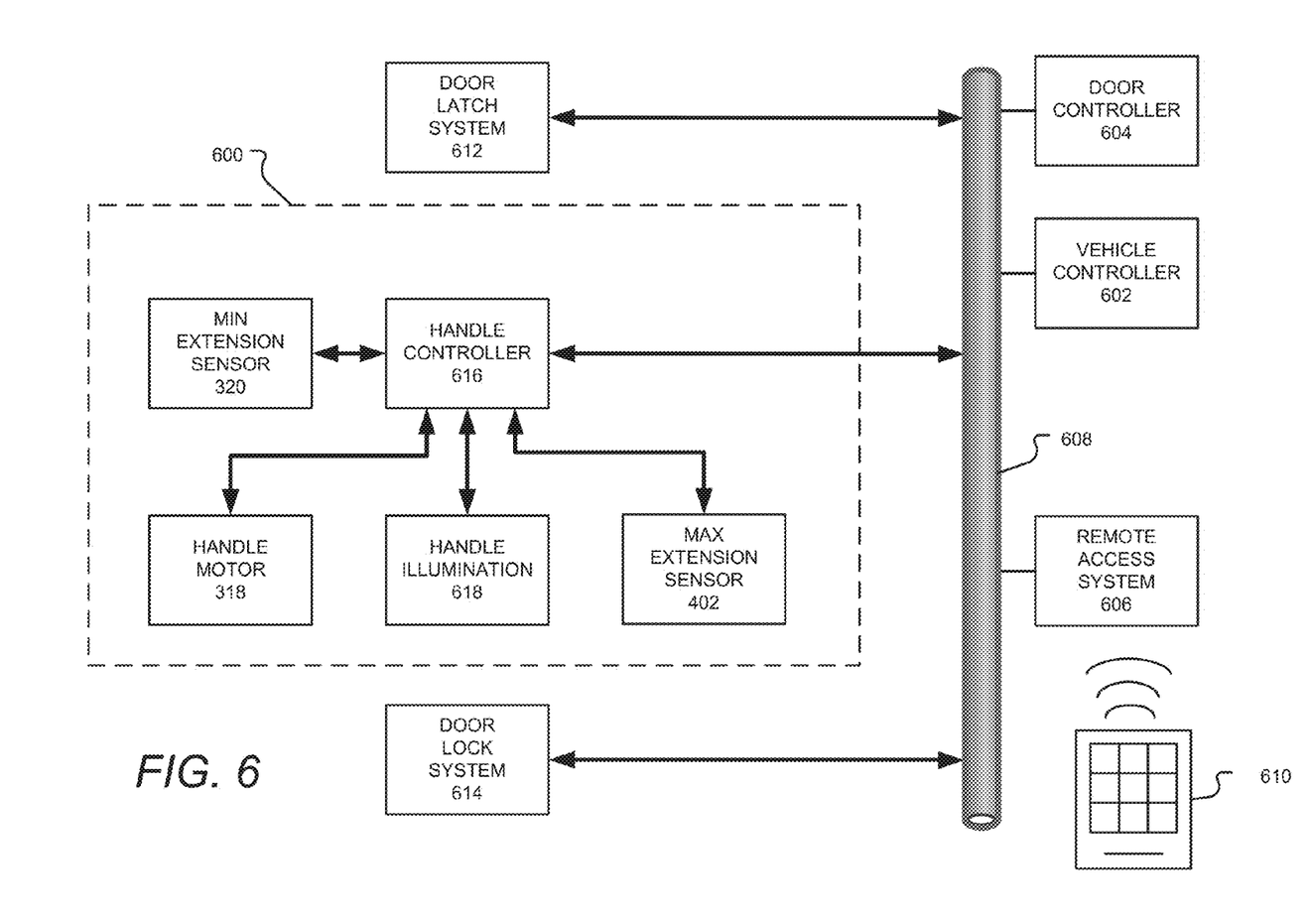
FIG. 6 schematically illustrates systems and electronics supporting operation of a door handle assembly in accordance with some embodiments.

FIG. 6 schematically illustrates systems and electronics supporting operation of a door handle assembly 200 in accordance with some embodiments. As illustrated, these systems may include door handle system 600, a vehicle controller 602, a door controller 604, a remote access system 606, a wireless controller 610, a door latch system 612, and a door lock system 614. In one embodiment, door handle system 600 operates door handle 104 while door controller unit 604 actuates door latch system 612 and/or door lock system 614.

The door handle system 600 in one embodiment includes min extension sensor 320, handle motor 318, max extension sensor 402, handle controller 616, and handle illumination 618. Typically, handle controller 616 receives sensor data from min extension sensor 320 or max extension sensor 402 then uses the results to determine whether to extend or retract the door handle 102. Handle controller 402 may also use vehicle status information from door controller 604 and vehicle controller 602 in determining when to extend or retract door handle 102. For example, if vehicle controller 602 indicates a vehicle is moving then door handle system may not extend door handle 104. In general, handle controller 616, door controller 604, and vehicle controller 602 may include one or more embedded or general purpose processors running a variety of software or firmware configured to control door handle 104 and operation of other various portions of the vehicle.

Figure 5A:
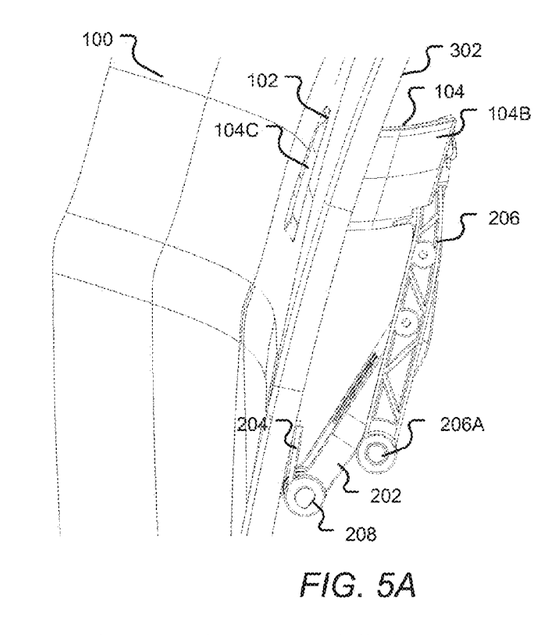
FIG. 5A-B provides a perspective side view of a vehicle door and portions of a door handle assembly with a door handle in both a retracted (FIG. 5A) and an extended position (FIG. 5B) in accordance with some embodiments.

When door handle 104 is retracted as illustrated in FIG. 5A, a users hand may push inward on planar handle member 104C causing min extension sensor 320 to send a signal requesting to extend vehicle handle 104. Before fulfilling the request to extend, handle controller 616 may communicate with vehicle controller 602 to check vehicle status and get authorization to extend door handle 104. For example, vehicle controller unit 602 may authorize extending door handle 104 if the vehicle is not moving and the person pushing on the door handle 104 possesses a proper wireless controller 610 such as a key fob. Accordingly, vehicle controller 602 in one embodiment may further check with remote access system 606 for this condition before authorizing handle controller 616 to operate handle motor 318 and extend door handle 104 as previously described.

Figure 5B:
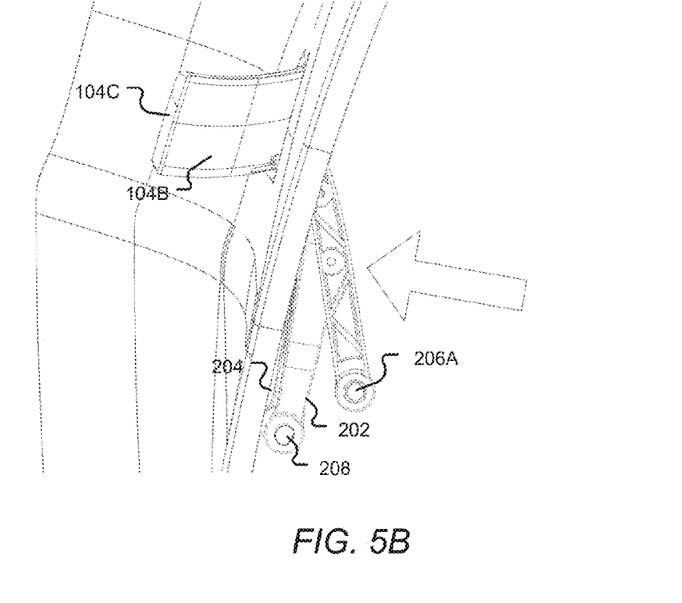

In the event door handle 104 is extended as depicted in FIG. 5B, a user's hand may pull on wrapped handle grip 112 causing max extension sensor 402 to send a signal requesting to unlatch the vehicle door. Instead of fulfilling this request, one embodiment of handle controller 616 forwards the request to unlatch the vehicle door to vehicle controller unit 602. In turn, vehicle controller unit 602 may authorize door controller 604 to unlatch the vehicle door if the vehicle is not moving and the person pulling on the door handle 104 possesses a proper wireless controller 610 such as a key fob. Accordingly, vehicle controller unit 602 in one embodiment may also check for the key fob using remote access system 606 before providing authorization to unlatch the vehicle door.

For added safety and convenience, an illumination module 702 incorporated in door handle 104, and illustrated in FIGS. 7A-H, provides lighting to assist using a vehicle door in low-light conditions or darkness. This may be useful when accessing a car at night, in evening hours, or a dark area such as an unlit parking garage or tunnel. As a person approaches a vehicle holding wireless controller 610 from FIG. 6, some embodiments of handle controller 616 instruct door handle 104 to extend and handle illumination 618 to energize the illumination module 702 in each door. In some embodiments, handle illumination 618 includes an illumination module 702, wires, and other electronics needed for illumination module 702 to emit light.

Figure 7A:
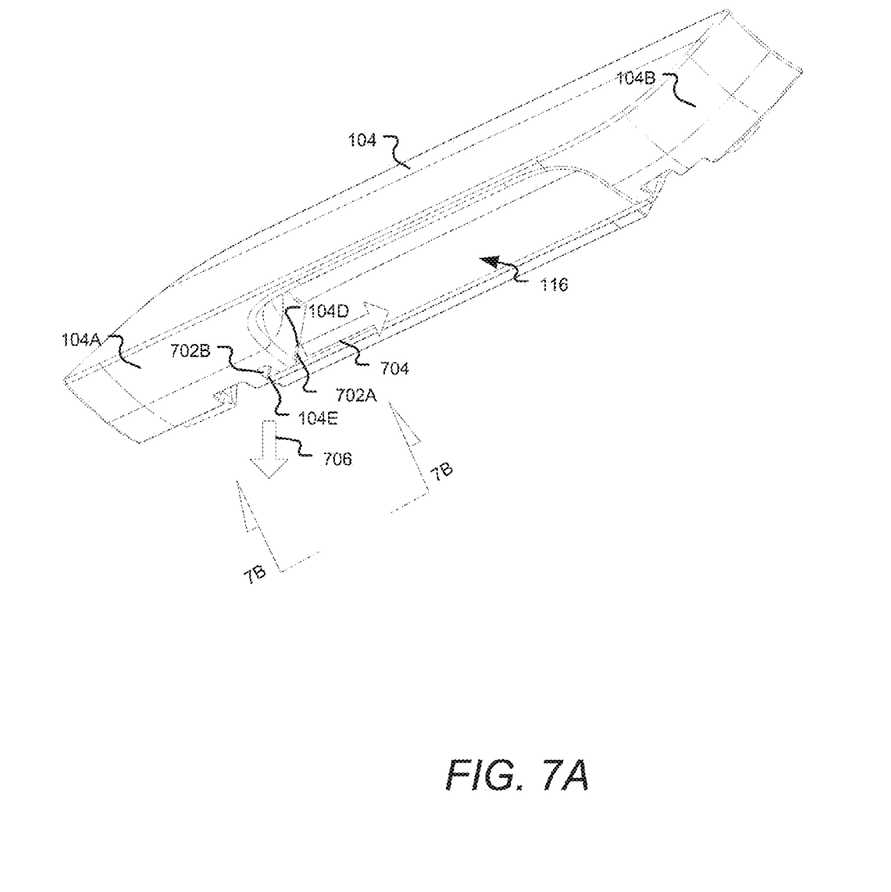
FIGS. 7A-H illustrate, from various perspectives, an illumination module with an illumination source incorporated in a door handle in accordance with some embodiments, including an approximate 90 degree orientation in FIG. 7A, an enlarged backside view of a door handle in FIG. 7B, and an illumination module enlarged and positioned in different orientations in FIG. 7C-F.
Figure 7B:
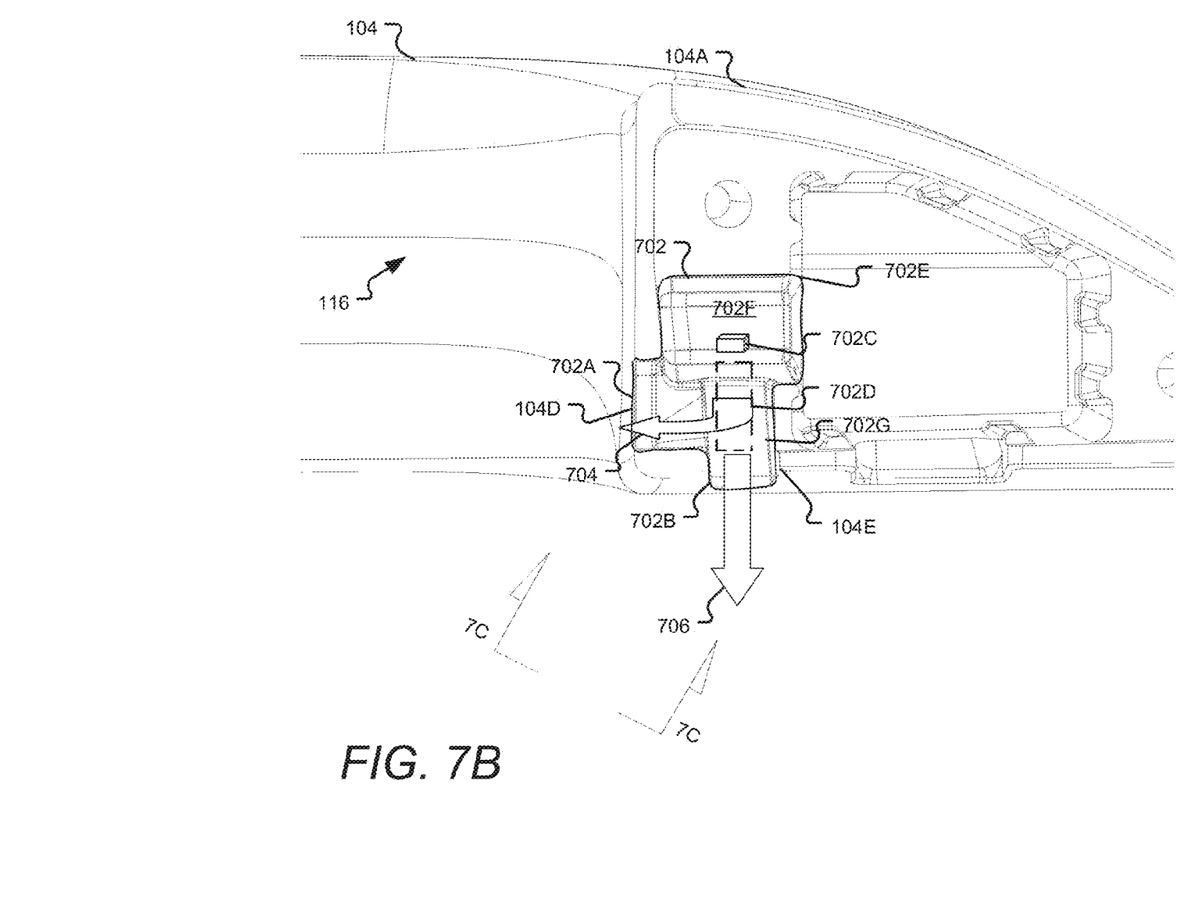
Figures 7C, 7D, 7E, 7F:
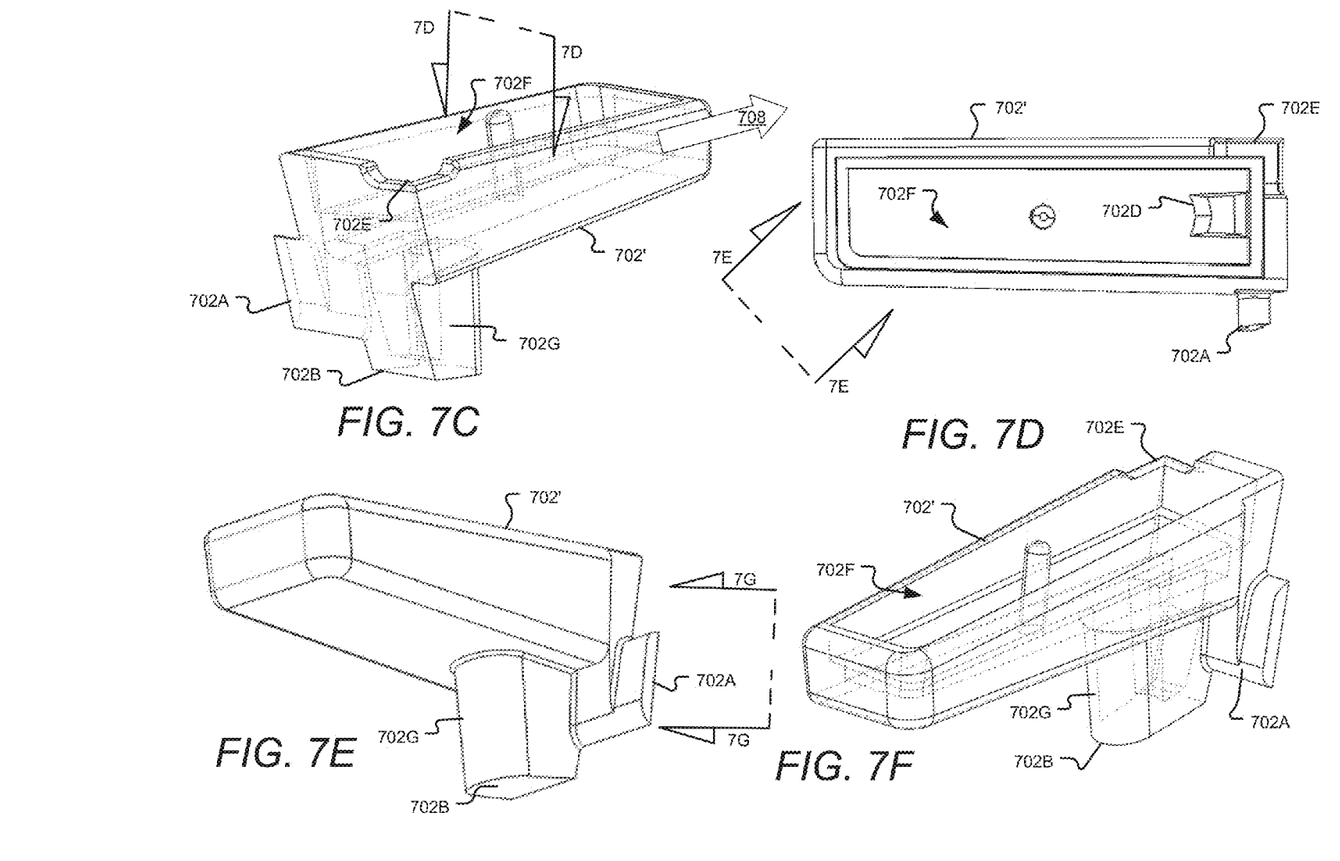
Figure 7G:
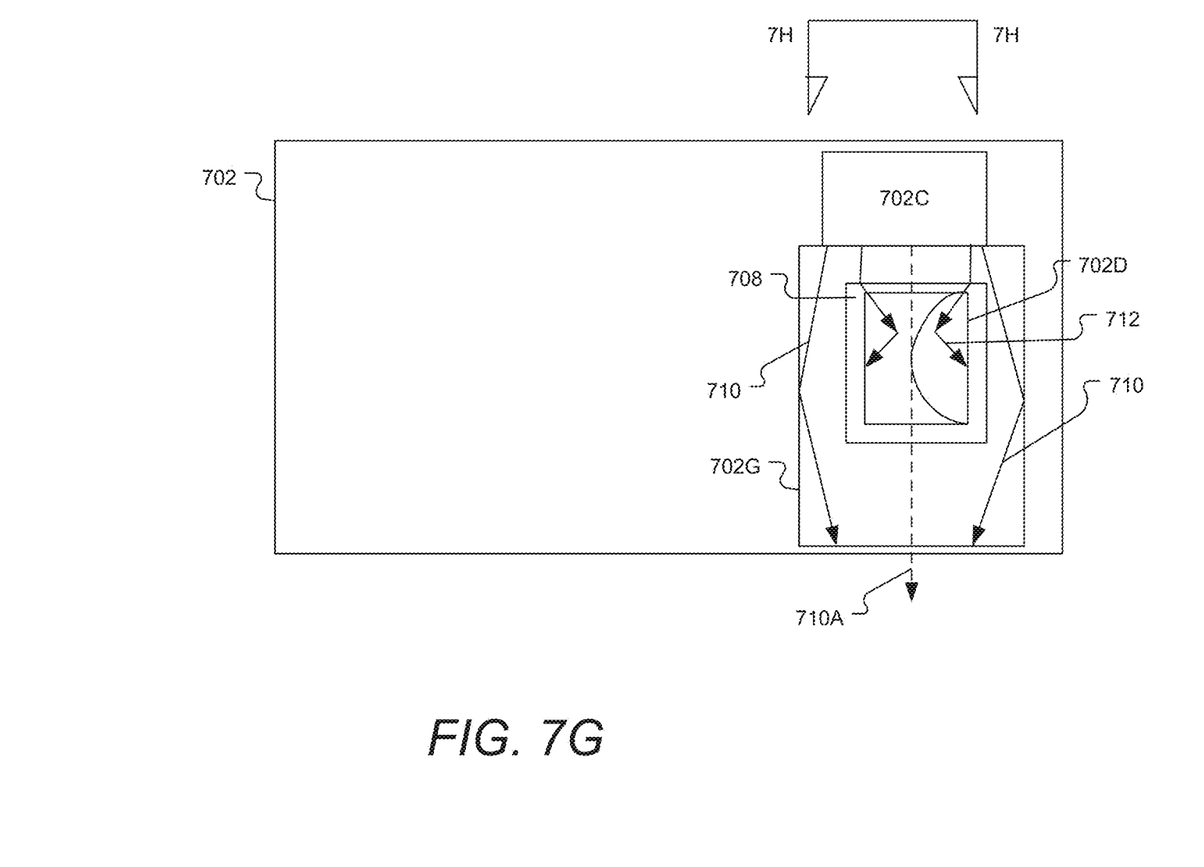
Figure 7H:
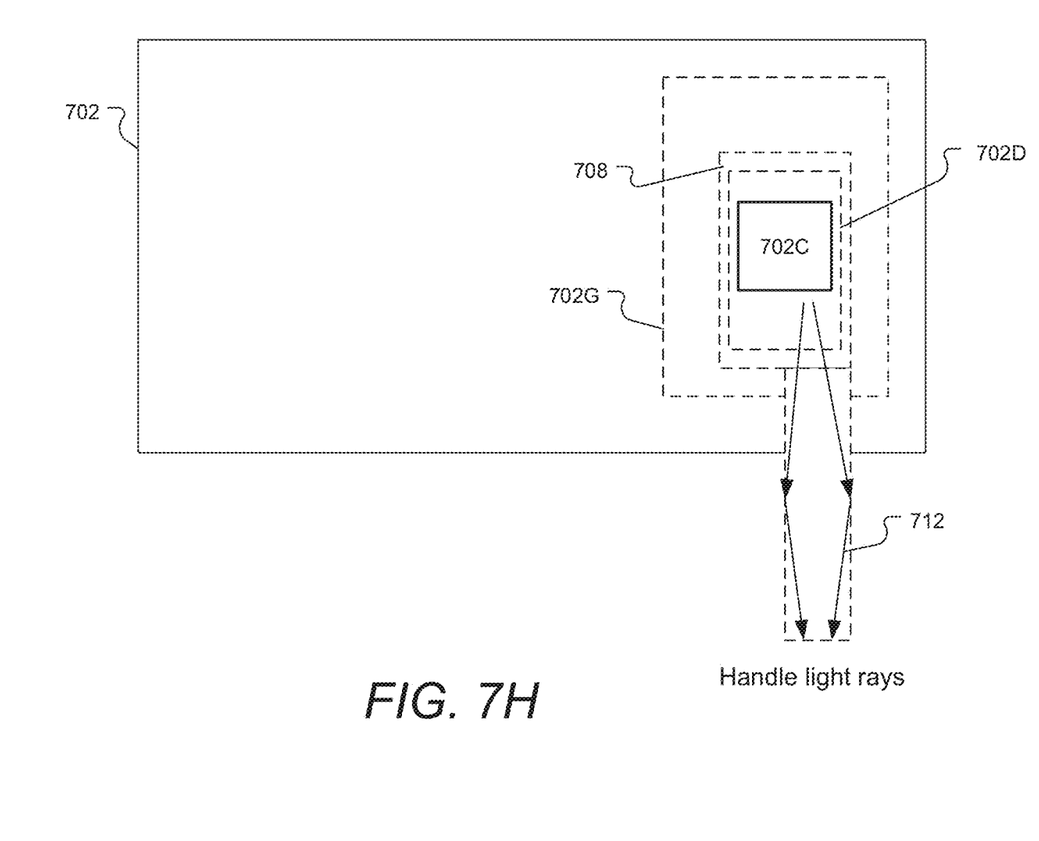

Illumination module 702 fits in a relatively compact area within the door handle 104 unlikely to be used when a hand operates door handle 704, this helps ensure that the light produced by the illumination module 702 is not blocked or hindered when the vehicle door is opened or otherwise used during normal operation. In some embodiments, illumination module 702 is fitted inside handle 104 near the distal end of second post portion 104A providing light through first illumination aperture 104D and second illumination aperture 104E. To present light in two different directions, first illumination aperture 104D may be oriented in a first direction while second illumination aperture 104E may be oriented in a second direction, different from the first direction. Generally, light from first illumination aperture 104D helps a person locate door handle 104 for opening the door while the second illumination aperture 104E may help a person avoid puddles, holes, or other hazards on the ground near the door handle 104 and/or the door.

If the angle between first illumination aperture 104D and second illumination aperture 104E is approximately 90 degrees, light transmitted in first illumination direction 704 illuminates handle cavity area 116 while light in second illumination direction 706 oriented downwards tends to illuminate a ground area below the door handle 104. To provide the optimal amount of light, the illumination module 702 has a first illumination surface 702A and a second illumination surface 702B oriented with a similar angle corresponding to first illumination aperture 104D and second illumination aperture 104E respectively. Accordingly, while an approximate 90 degree orientation appears in FIG. 7A, alternate embodiments may use different orientations changing the first illumination direction 704 and second illumination direction 706 as desired. In these alternate embodiments, a door handle 104 may be designed with a maximum angle between first illumination aperture 104D and second illumination aperture 104E of 30 degrees, 45 degrees, 180 degrees, as well as other angular orientations. Likewise, first illumination surface 702A and second illumination surface 702B would be designed and configured to match the orientation of these aperture openings corresponding to a maximum of 30 degrees, 45 degrees, 90 degrees, 180 degrees, and other similar angular orientations Several features of illumination module 702 allow it to fit in the compact area of door handle 104 while also providing light in two different directions. As illustrated by the enlarged backside view of door handle 104 in FIG. 7B, the illumination module 702 is of a unitary molded design slidably inserted into a cavity at the distal end of the second post portion 104A. In some embodiments, the illumination module 702 incorporates an illumination source 702C, an encapsulated light pipe 702D, a wiring slot 702E, a potting area 702F, and a surrounding light pipe 702G.

Illumination source 702C may be implemented using a single high powered LED providing light to both the encapsulated light pipe 702D and the surrounding light pipe 702G. To increase the intensity, some embodiments may use two or more LEDs to produce higher intensity light shared in a similar manner through the pair of light pipes within illumination module 702. Depending on the LED requirements, wiring passes through wiring slot 702E may deliver 3V-12V DC with current limited by one or several resistor packs and other circuitry capable of driving the illumination source 702C to desired levels of illumination. When illumination module 702 is not fully encapsulated through the injection molding process, potting area 702F may be used to insert a protective filler material such as silicone, polyurethane, or epoxy thereby sealing components within the illumination module 702 from moisture and other contaminants.

Depending on status of the vehicle, ambient lighting, and other conditions, handle controller 616 instructs illumination source 702C to generate and deliver light to a pair of light pipes: a first light pipe surrounded by a second light pipe. As illustrated in FIG. 7B, in some embodiments the first light pipe is encapsulated light pipe 702D and the second light pipe is surrounding light pipe 702G. As light from illumination source 702C passes through the second light pipe, a air gap 708 created between the second light pipe and first light pipe refracts a portion of the light and causes it to travel along the first light pipe. In some embodiments, the first light pipe, such as encapsulated light pipe 702D, receives a first portion of the refractive light from the illumination source 702C and directs it towards a first illumination surface 702A, oriented in a first direction. As these light rays in the first portion of light are captured, reflective properties associated with the interior walls of the encapsulated light pipe 702D pass the light rays along until they exit the first illumination surface 702A and pass through first illumination aperture 104D. By orienting the first light pipe and first illumination surface 702A towards the inside area of wrapped handle grip 112, handle pocket 116 is illuminated by handle light rays 712 and more readily seen in darker or low-light conditions.

Remaining light rays from illumination source 702C not refracted by way of air gap 708 continue through the second light pipe, such as surrounding light pipe 702G. When the surrounding light pipe 702G and second illumination surface 702B are pointed downward, ground light rays 710 pass through the second illumination aperture 104E towards the ground area below the door handle 104 helping illuminate puddles, debris, or other hazards. Even as light rays are refracted by air gap 708, some may pass through encapsulated light pipe 702D and then reenter surrounding light pipe 702G thereby creating additional ground light rays 710A to illuminate the ground area below. Accordingly, the second light pipe may combine both ground light rays 710 and additional ground light rays 710A and direct towards the second illumination surface 702B.

In general, sealing surrounding light pipe 702G around encapsulated light pipe 702D by injection molding, over molding, or other similar approaches reduces the attenuation and loss of light between the two light pipes yet while allowing light to be redirected in at least two directions. By coupling the light pipes together, the illumination source 702C can be shared and the illumination module 702 takes up significantly less space. Alignment is also maintained as the illumination source 702C is surface mounted to top of the injection molded first and second light pipe. No additional framework is required to hold or position the illumination source 702C as it is rigidly attached to the integral body of the light pipes.

FIGS. 7C-7F illustrate an illumination module 702' enlarged and positioned in different orientations without the illumination source and electronics in accordance with some embodiments. An insertion arrow 708 indicates the direction one embodiment of illumination module 702' may be slidably inserted into the backside of door handle 104. These enlarged views also identify the location of wiring slot 702E where the wires for illumination module 702' would be received and used for powering the illumination source 702C. Potting area 702F is also identified as the area silicone, polyurethane, or epoxy may be inserted to seal components and generally protect inserted within illumination module 702' when it is assembled.

While specific embodiments have been described herein for purposes of illustration, various modifications may be made without departing from the spirit and scope of the disclosure. Accordingly, the disclosure is not limited to the above-described implementations, but instead is defined by the appended claims in light of their full scope of equivalents.

What is claimed is:

1. A door handle assembly used in a vehicle handle, comprising:
   a door handle having a handle grip pocket and a first illumination aperture oriented in a first direction and a second illumination aperture oriented in a second direction, different from the first direction; and
   an illumination module configured to fit inside the door handle having an illumination source and circuitry for generating light further including,
   a first light pipe that receives a first portion of light from the illumination source and directs the first portion of light towards a first illumination surface in the first direction and through the first illumination aperture, and
   a second light pipe encapsulating the first light pipe that receives a second portion of light from the illumination source and directs the second portion of light towards a second illumination surface in the second direction and through the second illumination aperture.

2. The door handle assembly of claim 1 wherein the handle grip pocket is formed between a first post portion and a second post portion extending from a planar handle member of the door handle.

3. The door handle assembly of claim 2 wherein the first illumination aperture and the second illumination aperture are both located at a distal end of the second post portion of the door handle.

4. The door handle assembly of claim 1 wherein an angle between the first illumination aperture and the second illumination aperture does not exceed a maximum angle selected from a set of maximum angles including a 30 degree angle, a 45 degree angle, a 90 degree angle, and a 180 degree angle.

5. The door handle assembly of claim 3 wherein the illumination module includes one light emitting diode (LED) device for producing light.

6. The door handle assembly of claim 3 wherein the illumination module includes two or more light emitting diode (LED) devices for producing light.

7. The door handle assembly of claim 2 wherein the illumination module fits inside the door handle at a distal portion of the first post portion of the planar handle member.

8. The door handle assembly of claim 1 wherein the first light pipe and the second light pipe are overmolded to fit over the illumination module.

9. The door handle assembly of claim 1 where an angle between the first illumination surface of the first light pipe and the second illumination surface of the second light pipe does not exceed a maximum angle selected from a set of maximum angles including a 30 degree angle, a 45 degree angle, a 90 degree angle, and a 180 degree angle.

10. The door handle assembly of claim 1 wherein the first illumination aperture in the first direction is oriented towards an inside area of the handle grip pocket and the second illumination aperture in the second direction is oriented towards a ground area below the door handle assembly.

11. An illumination module for use in a door handle for a vehicle, comprising:
    an illumination source having circuitry for producing light within the door handle;
    a first light pipe having a first illumination surface that receives a first portion of light from the illumination source and directs the first portion of light in a first direction towards the first illumination surface; and
    a second light pipe encapsulating the first light pipe that receives a second portion of light from the illumination source and directs the second portion of light in a second direction, different from the first direction, towards a second illumination surface.

12. The illumination module of claim 11 wherein the first illumination surface directs the first portion of light in the first direction towards an inside area of a handle grip pocket and the second illumination surface directs the second portion of light in the second direction towards a ground area below the door handle.

13. The illumination module of claim 11 wherein the illumination source includes one light emitting diode (LED) device for producing light.

14. The illumination module of claim 11 wherein the illumination source includes two or more light emitting diode (LED) devices for producing light.

15. The illumination module of claim 11 wherein the first light pipe is completely surrounded by the second light pipe and both the first light pipe and second light pipe are injection molded to fit over the illumination module.

16. The illumination module of claim 11 where an angle between the first illumination surface of the first light pipe and the second illumination surface of the second light pipe does not exceed a maximum angle selected from a set of maximum angles including a 30 degree angle, a 45 degree angle, a 90 degree angle, and a 180 degree angle.

\* \* \* \* \*